(12) United States Patent
Sun (10) Patent No.: US 9,910,555 B2
(45) Date of Patent: Mar. 6, 2018

(54) METHODS FOR OPERATING MULTIPLE WINDOWS ON A HANDHELD MOBILE TERMINAL AND THE HANDHELD MOBILE TERMINAL CONDUCTING THE SAME

(71) Applicants: Hisense Mobile Communications Technology Co.,Ltd., Qingdao, Shandong (CN); Hisense USA Corp., Suwanee, GA (US)

(72) Inventor: Guochen Sun, Shandong (CN)

(73) Assignees: Hisense Mobile Communications Technology Co., Ltd., Shandong (CN); Hisense USA Corp., Suwanee, GA (US)

( * ) Notice: Subject to any disclaimer, the term of this patent is extended or adjusted under 35 U.S.C. 154(b) by 266 days.

(21) Appl. No.: 14/452,238

(22) Filed: Aug. 5, 2014

(65) Prior Publication Data

US 2015/0309668 A1    Oct. 29, 2015

(30) Foreign Application Priority Data

Apr. 24, 2014    (CN) .......................... 2014 1 0168234

(51) Int. Cl.
*G06F 3/048* (2013.01)
*G06F 3/0481* (2013.01)
*G06F 3/0484* (2013.01)
*G06F 3/0488* (2013.01)

(52) U.S. Cl.
CPC .......... *G06F 3/0481* (2013.01); *G06F 3/0488* (2013.01); *G06F 3/04842* (2013.01); *G06F 3/04845* (2013.01)

(58) Field of Classification Search
CPC ............... G06F 3/0481; G06F 3/04842; G06F 3/04845; G06F 3/0488
See application file for complete search history.

(56) References Cited

U.S. PATENT DOCUMENTS

| | | | |
|---|---|---|---|
| 2006/0086022 A1* | 4/2006 | Would | G06F 3/0482 40/584 |
| 2013/0120447 A1* | 5/2013 | Kim | G06T 11/60 345/629 |
| 2014/0280180 A1* | 9/2014 | Edecker | G06F 17/30598 707/740 |

FOREIGN PATENT DOCUMENTS

| | | |
|---|---|---|
| CN | 101778166 A | 7/2010 |
| CN | 103116438 A | 5/2013 |
| CN | 103412713 A | 11/2013 |

OTHER PUBLICATIONS

First Office Action dated Sep. 4, 2017 for China Patent Application No. 201410168234.7 with English Translation (23 pp.).

(Continued)

*Primary Examiner* — Anil N Kumar
(74) *Attorney, Agent, or Firm* — Brinks Gilson & Lione (57) ABSTRACT

The present disclosure relates to handheld mobile terminals that implementing methods for a technology of displaying and adjusting sizes of multiple windows on a screen of a handheld mobile terminal. The handheld mobile terminal may be configured to display a plurality of windows together on a screen. Under an edit mode, the handheld mobile terminals may receive a first instruction from a user of the handheld mobile terminal to adjust a target window of the plurality of windows to any size the user wishes; and adjust the size of the target window according to the instruction.

17 Claims, 6 Drawing Sheets

(56) References Cited

OTHER PUBLICATIONS

Search Report received from the State of Intellectual Property of People's Republic of China for Application No. 201410168234.7 dated Aug. 25, 2017 with English translation (4 pp.).

* cited by examiner

```
┌─────────────────────────────────────────────────────────────┐
│ 302: a mobile terminal displays multiple windows together on a screen of │
│                    the mobile terminal                      │
└─────────────────────────────────────────────────────────────┘
                              │
┌─────────────────────────────────────────────────────────────┐
│           304: the mobile terminal switches into an edit mode            │
└─────────────────────────────────────────────────────────────┘
                              │
┌─────────────────────────────────────────────────────────────┐
│ 306: the mobile terminal adjusts a size of a target window according to │
│                    an adjusting instruction                 │
└─────────────────────────────────────────────────────────────┘
                              │
┌─────────────────────────────────────────────────────────────┐
│   308: the mobile terminal switches a layout of the multiple windows    │
│              between an overlap mode and an tiled mode      │
└─────────────────────────────────────────────────────────────┘
                              │
┌─────────────────────────────────────────────────────────────┐
│  310: the mobile terminal moves the target window from one location to  │
│                    another on the screen                    │
└─────────────────────────────────────────────────────────────┘
```

Fig. 3

METHODS FOR OPERATING MULTIPLE WINDOWS ON A HANDHELD MOBILE TERMINAL AND THE HANDHELD MOBILE TERMINAL CONDUCTING THE SAME

PRIORITY STATEMENT

This application claims the priority benefit of Chinese Patent Application No. 201410168234.7 filed on Apr. 24, 2014, the disclosure of which is incorporated herein by reference in its entirety.

TECHNICAL FIELD

The present disclosure relates to the field of mobile terminal technologies. Specifically, the present disclosure relates to methods for operating multiple windows on a handheld mobile terminal and the mobile terminal conducting the same as functions.

BACKGROUND

Current users of mobile terminals, such as smart phones, tablet computers, have higher and higher performance requirements to the mobile terminals. Such performance requirements lie not only in hardware components in the mobile terminals, but also in performance of software applications.

For example, ANDROID™ is a system platform specially designed for and widely adopted by smart mobile terminals. Most smart phones that use ANDROID™ as operation system only process one interface of one application at one time, i.e., an ANDROID™ smart phone only displays one window to a user at one time and there is no option to freely adjust the size of the window. For example, when a user watches a video, the ANDROID™ smart phone displays only the video on its screen. But when the user wishes to check a short message, the user must first close or minimize the video interface in order to turn on and switch to a window for a short messages application. The user cannot open multiple windows at the same time and the size of the window currently opened cannot be freely adjusted.

SUMMARY

The present disclosure relates to methods for providing handheld mobile terminals functions of displaying and adjusting sizes of multiple windows on a screen of a handheld mobile terminal. The methods improve the functioning of the handheld mobile terminal and improve the technology of displaying and operating multiple windows on the handheld mobile terminal. The present disclosure also relates to handheld mobile terminals implementing the methods.

According to an aspect of the present disclosure, a handheld mobile terminal may comprise a screen; a processor-readable storage medium; and a processor in communication with the storage medium. The storage medium may store a set of instructions for operating multiple windows on the handheld mobile terminal. The processor may execute the set of instruction and may be directed to display a plurality of windows together on the screen and switch to an edit mode to: receive a first instruction from a user of the handheld mobile terminal to adjust a target window of the plurality of windows to any size the user wishes; and adjust the size of the target window according to the instruction.

According to another aspect of the present disclosure, a method for operating multiple windows on a handheld mobile terminal may comprise providing a handheld mobile terminal to a user, wherein the handheld mobile terminal comprises a screen; displaying, by the handheld mobile terminal, a plurality of windows together on the screen; and switching the handheld mobile terminal to an edit mode. Under the edit mode, the handheld mobile terminal may receive a first instruction from the user to adjust a target window of the plurality of windows to any size that the user wishes; and adjust the size of the target window according to the instruction.

According to yet another aspect of the present disclosure, a non-transitory processor-readable storage medium may comprise a set of instructions for operating multiple windows on the handheld mobile terminal. When executed by a processor of a handheld mobile terminal, the set of instructions may direct the processor to perform acts of: displaying a plurality of windows together on a screen of the handheld mobile terminal; and switching to an edit mode. Under the edit mode, the processor may be directed to receive a first instruction from a user of the handheld mobile terminal to adjust a target window of the plurality of windows to any size that the user wishes; and adjust the size of the target window according to the instruction.

DESCRIPTIONS OF THE DRAWINGS

The above and other features and advantages will become more apparent by describing in detail example embodiments thereof with reference to the attached drawings in which.

DETAILED DESCRIPTION OF THE INVENTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure relates to methods for providing handheld mobile terminals functions of displaying and adjusting sizes of multiple windows on a screen of a mobile terminal. The methods purport improvements of the functioning of the mobile terminal and improve the technology of displaying and operating multiple windows on the mobile terminal. The present disclosure also relates to handheld mobile terminals implementing the methods.

Figure 1:
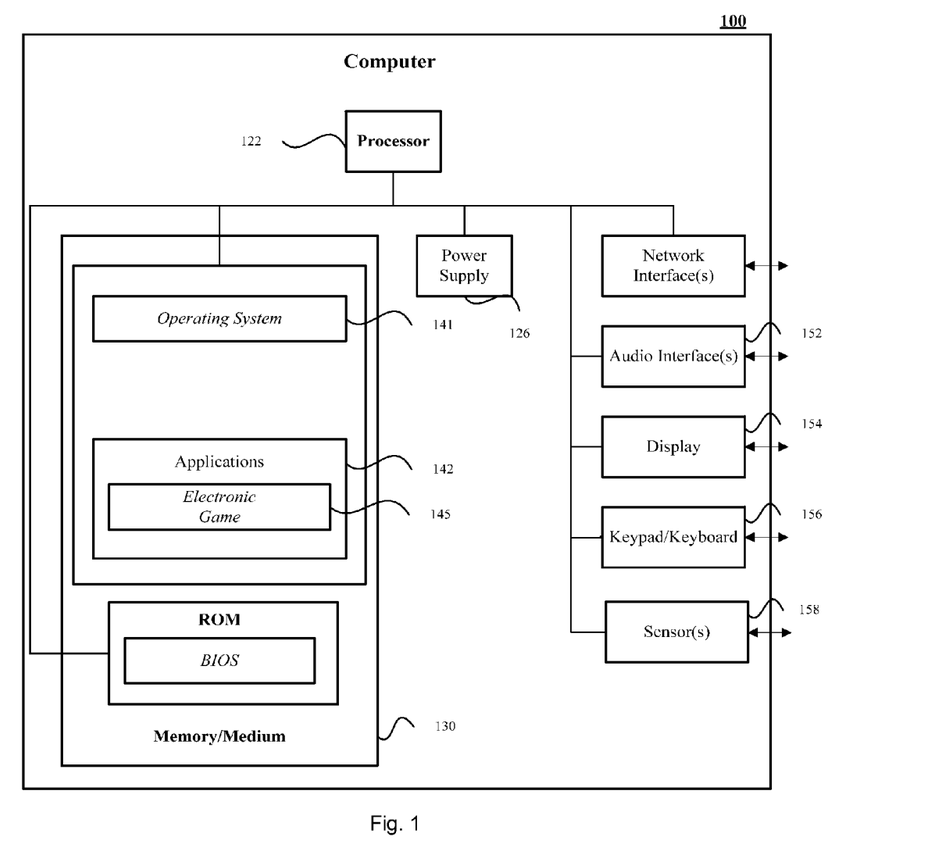
FIG. 1 is a schematic diagram illustrating an example embodiment of a mobile terminal.

FIG. 1 is a schematic diagram illustrating an example embodiment of a handheld mobile terminal (hereinafter "mobile terminal"). The mobile terminal may include apparatuses to execute methods and software systems introduced in the present disclosure. A mobile terminal 100 may be capable of executing a software system. The mobile terminal 100 may, for example, be a portable wireless communication device small enough to be held by a hand and with display, circuitry, and battery in a single unit, such as a tablet computer, a cellular telephone, or a smart phone. A desktop computer or a laptop computer is not a handheld mobile terminal.

The mobile terminal 100 may vary in terms of capabilities or features. Claimed subject matter is intended to cover a wide range of potential variations. For example, the mobile terminal 100 may include a keypad/keyboard 156 and a sensor 158, such as an accelerometer. It may also include a display 154, such as a liquid crystal display (LCD), or a display with a high degree of functionality, such as a touch-sensitive color 2D or 3D display (e.g., touch screen). In contrast, however, as another example, a web-enabled mobile terminal 100 may include one or more physical or virtual keyboards, and mass storage medium 130.

The mobile terminal 100 may also include or may execute a variety of operating systems 141, including an operating system, such as a mobile operating system, such as iOS™, ANDROID™, or WINDOWS MOBILE™. The mobile terminal 100 may include or may execute a variety of possible applications 142, such as an electronic game 145. An application 142 may enable communication with other devices via a network, such as communicating with another mobile terminal, a computer or content server via a network.

Further, the mobile terminal 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions, or units and/or modules that include the sets of instructions, for conducting operations and/or method steps described in the present disclosure. Alternatively, the units and/or modules may be hardware disposed in the mobile terminal 100 configured to conduct operations and/or method steps described in the present disclosure. The one or more processors may be configured to execute the sets of instructions and perform the methods and/or operations in example embodiments of the present disclosure.

Merely for illustration, only one processor will be described in mobile terminals that execute operations and/or method steps in the following example embodiments. However, it should be note that the mobile terminals in the present disclosure may also include multiple processors, thus operations and/or method steps that are performed by one processor as described in the present disclosure may also be jointly or separately performed by the multiple processors. For example, if in the present disclosure a processor of a mobile terminal executes both step A and step B, it should be understood that step A and step B may also be performed by two different processors jointly or separately in the mobile terminal (e.g., the first processor executes step A and the second processor executes step B, or the first and second processors jointly execute steps A and B).

Figure 2A:
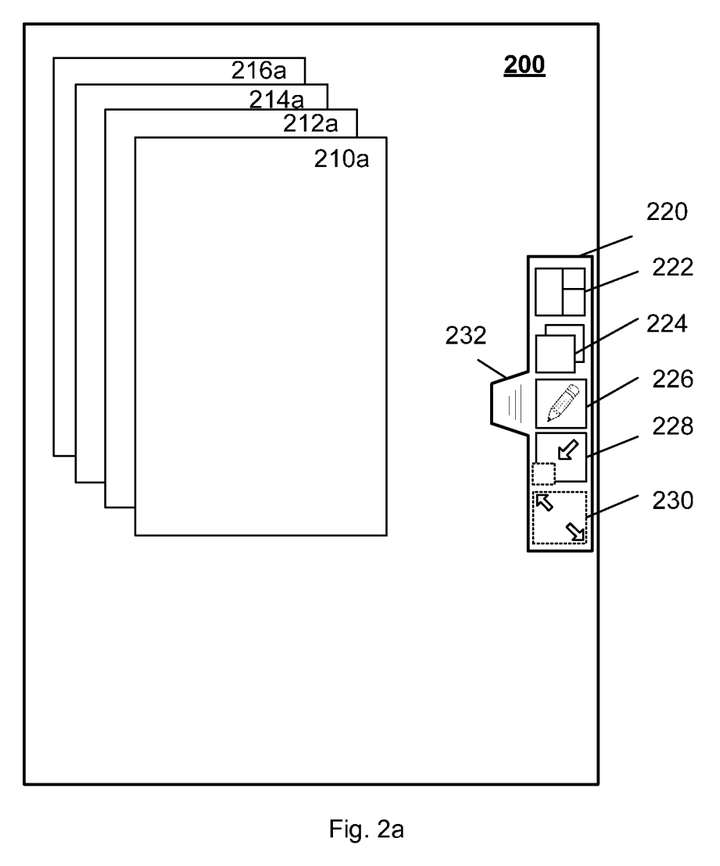
FIG. 2a shows an example of a screen of a mobile terminal displaying multiple windows under an overlap mode.

FIG. 2a shows an example of a screen layout of the mobile terminal 100 displaying multiple windows under an overlap mode. The screen 200 may correspond to the display 154 of the mobile terminal 100. According to example embodiments of the present disclosure, the mobile terminal 100 may implement a program (e.g., a set of instructions) stored in the storage media 130, enabling the processor to process multiple application and/or display multiple windows (i.e., an interface of an application) 210a, 212a, 214a, 216a on the screen 200. The program may be part of the operation system of the mobile terminal 100, such as ANDROID™. Alternatively, the program may be an independent application being called by the operation system.

When multiple applications are run by the mobile terminal 100, and/or when there are multiple windows for a single application (e.g., when a user opens multiple web pages using a browser), the mobile terminal 100 may display the multiple windows 210a, 212a, 214a, 216a together on the screen. Under the overlap mode, the multiple windows 210a, 212a, 214a, 216a may be displayed one overlap over the other. In FIG. 2a, the 210a is a window on top of the remaining windows 216a.

The screen 200 may also include a menu 220, which may locate vertically along the left edge of the screen 200, or locate at any place of the screen 200. The menu 220 may include a tab 232. When the screen 200 is a touch-sensitive screen, the user may be able to place a finger over the tab 232 and drag the menu 220 at any places on the screen 200. The menu 220 may also include several buttons, such as a window selecting button 224, a mode selecting button 222, an edit mode button 226, a minimization button 228, and a maximization button 230. Pressing the button may turn the mobile terminal 100 to a corresponding mode. Accordingly, the menu 220 may float over the windows 210a, 212a, 214a, 216a, so that the buttons 222, 224, 226, 228, and 230 are available to a user.

To select a target window, the user may press the window selecting button 224 on the menu 220. Each time the window selecting button 224 is pressed the mobile terminal 100 may detect the selection action of the user from the touch-sensitive screen 200 and select another window from the multiple windows 210b, 212a, 214a, 216a. Consequently, the mobile terminal 100 may bring the selected window to the top over the remaining windows. The user may also select the target window by directly press and/or touch the window he/she select from the multiple windows 210b, 212a, 214a, 216a. For example, the user may select window 214a as the target window to edit by touching window 214a. When the mobile terminal 100 detects the window selecting action from the user over the touch-sensitive screen 200, the mobile terminal 100 may place the selected window as a window on the top of the multiple windows 210b, 212a, 214a, 216a.

To maximize the target window 210b to full screen, the user may press the maximization button 230 in the menu 220. The mobile terminal 100 may detect the user's maximization operation over the touch-sensitive screen and maximize the target window 210b to full screen accordingly.

To minimize the target window 210b, the user may press the minimization button 228 of the menu 220. The mobile terminal 100 may detect the user's minimization operation over the touch-sensitive screen and minimize the target window 210b accordingly.

The user of the mobile terminal 100 may change the size of any windows displayed on screen 200. To this end, the user may first press the edit mode button 226 to turn the mobile terminal 100 into an edit mode. The mobile terminal may not respond to an editing operation and/or instruction unless it is in the edit mode. Alternatively, the user may achieve the edit mode by conducting a predetermined operation on the mobile terminal 100. For example, the user may press one or more predetermined keys on a keyboard 156 of the mobile terminal 100 to turn on the edit mode, or using three or more fingers to slide across the touch-sensitive screen under a present path or a random path. The user may also shake the mobile terminal 100 in a predetermined manner to turn the mobile terminal 100 to the edit mode. The acceleration sensor 158 of the mobile terminal 100 may detect the shaking operation and send data (e.g., frequency and amplitude information) of the shaking operation to the processor 122. The processor may compare the data with a reference shaking pattern previously set by the user and recorded in the storage media 130. If the processor 122 determines that the shaking operation matches the reference shaking pattern, the processor may turn the mobile terminal 100 into the edit mode.

Pressing the edit mode button 226 again may render the mobile terminal 100 to quit the edit mode.

Figure 2B:
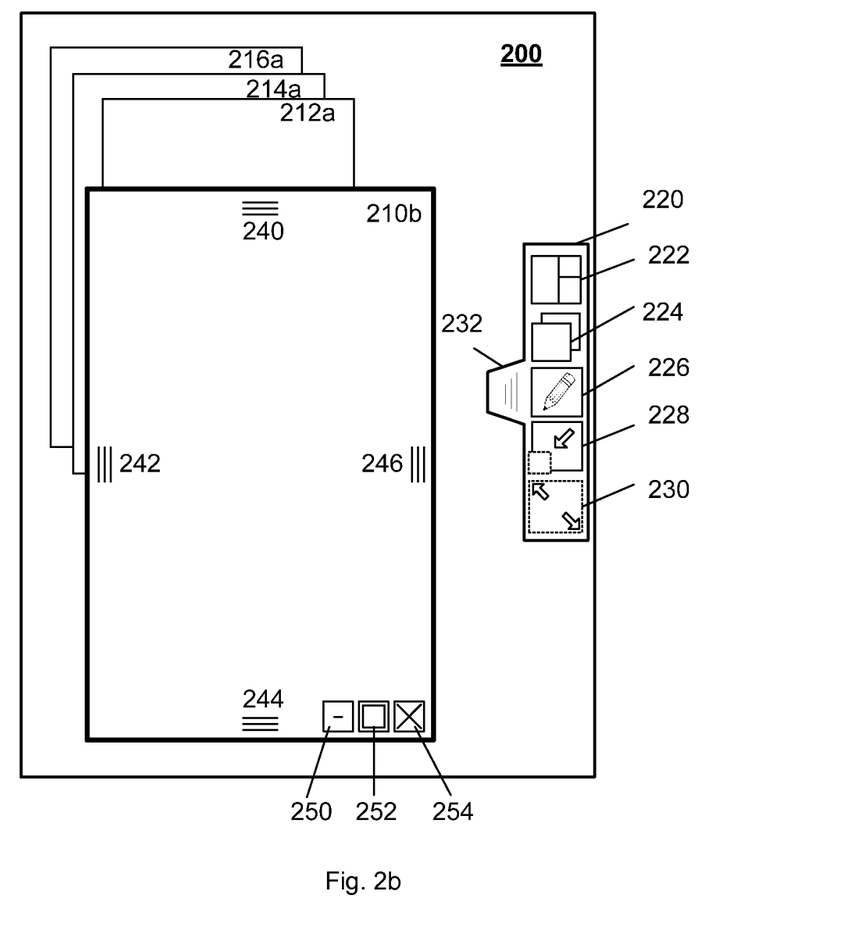
FIG. 2b shows the screen of the mobile terminal under edit mode when the windows layout is in the overlap mode.

FIG. 2b shows the screen 200 of the mobile terminal 100 under edit mode when the windows layout is in the overlap mode. When the mobile terminal 100 is turned to the edit mode, the mobile terminal 100 may notify the user about the edit mode. For example, the mobile terminal 100 may highlight the edges of a target window to be edited and/or display one or more editing buttons on the target window, wherein the target window may be the window on top of other windows. For example, in FIG. 2b, the target window is window 210b, which corresponds to window 210a in FIG. 2a. When the user press the mode edit button 226 after the target window 210b is selected, the mobile terminal 100 may highlight the four edges of the target window 210b and displays a close button 254, a maximization button 252, and a minimization button 250 on the target window 210b. If no target windows are selected, the mobile terminal 100 may highlight the four edges of all the windows displayed on the screen 200 and display the close button 254, the maximization button 252, and the minimization button 250 on each highlighted window. The close button 254 is configured to close the target window 210b; the maximization button 252 is configured to switch the target window 210b to full screen; and the minimization button 250 is configured to minimize the target window 210b.

Additionally, the mobile terminal 100 may also notify the user about the edit mode by generating a vibration, playing a predetermined audio signal over its speaker 152, displaying an animation effect on the screen 200, showing a special color over the edit button, or placing a colorful transparent layer (e.g., transparent blue layer) over the entire screen or over the target window to be edited.

Once the mobile terminal 100 is in the edit mode, the mobile terminal 100 may start to receive and respond to editing operations and/or instructions from the user. The user may conduct various editing operations over the target window 210b. For example, the user may enlarge, reduce, move, and/or close the target window. The user may also maximize and minimize the target window under the edit mode.

To enlarge or reduce the size of the target window 210b, the user may place two fingers on the target window 210b and slide the two fingers apart (e.g., sliding the two fingers in opposite directions, or sliding one finger while keeping the other finger still). The mobile terminal 100 may detect the sliding action from the user over the touch-sensitive screen and adjust the size of the target window 210b accordingly. The user may adjust the target window 210b to any size the user wishes.

Alternatively, the mobile terminal 100 may display an adjustment indicator 240, 242, 244, 246 on each edge of the target window 210b for the user to adjust the size of the target window 210b. The adjustment indicators 240, 242, 244, 246 may be a control locating at specific places along the corresponding edge, or may be integrated together and along the entire edge of the target window 210b. To enlarge or reduce the size of the target window 210b, the user may place a finger over one of the adjustment indicators 240, 242, 244, 246 and drag the indicator up and/or down or left and/or right. The mobile terminal 100 may detect the dragging action from the user over the touch-sensitive screen and correspondingly move the corresponding edge of the adjustment indicators 240, 242, 244, 246, thereby expanding or reducing the size of the target window 210b to any size he/she wishes. Further, when any of the edges of the target window 210b is dragged to reach an edge of the screen 200, the mobile terminal 100 may automatically maximize the size of the target window 210b. For example, in FIG. 2b, when the vertical edge is dragged to touch the right edge of the screen 200, window 210b will be automatically maximized to become full screen.

To maximize the target window 210b to full screen, in addition to the maximization button 230, the user may press the maximization button 252 on the target window 210b. The mobile terminal 100 may detect the user's maximization operation over the touch-sensitive screen and maximize the target window 210b to full screen accordingly.

To minimize the target window 210b, in addition to the minimization button 228, the user may press the minimization button 250 on the target window. The mobile terminal 100 may detect the user's minimization operation over the touch-sensitive screen and minimize the target window 210b accordingly.

To move the target window 210b from one location to a new location of the screen 200, the user may touch a predetermined area on the target window with a finger and drag the window to the new location. Alternatively, the user may place the finger at anywhere on the target window 210b and drag the target window 210b to the new location. Alternatively, the mobile terminal 100 may also require the user to use two or more fingers to touch the area of the target window 210b in order to drag the target window 210b. When the mobile terminal 100 detects the moving action from the user over the touch-sensitive screen, it may move the target window 210b accordingly.

To close the target window 210b, the user may press the close button 254 on the target window 210b or simply drag the target window 210b out of the screen. When the mobile terminal 100 detects the closing action from the user over the touch-sensitive screen, it may close the target window 210b accordingly.

Figure 2C:
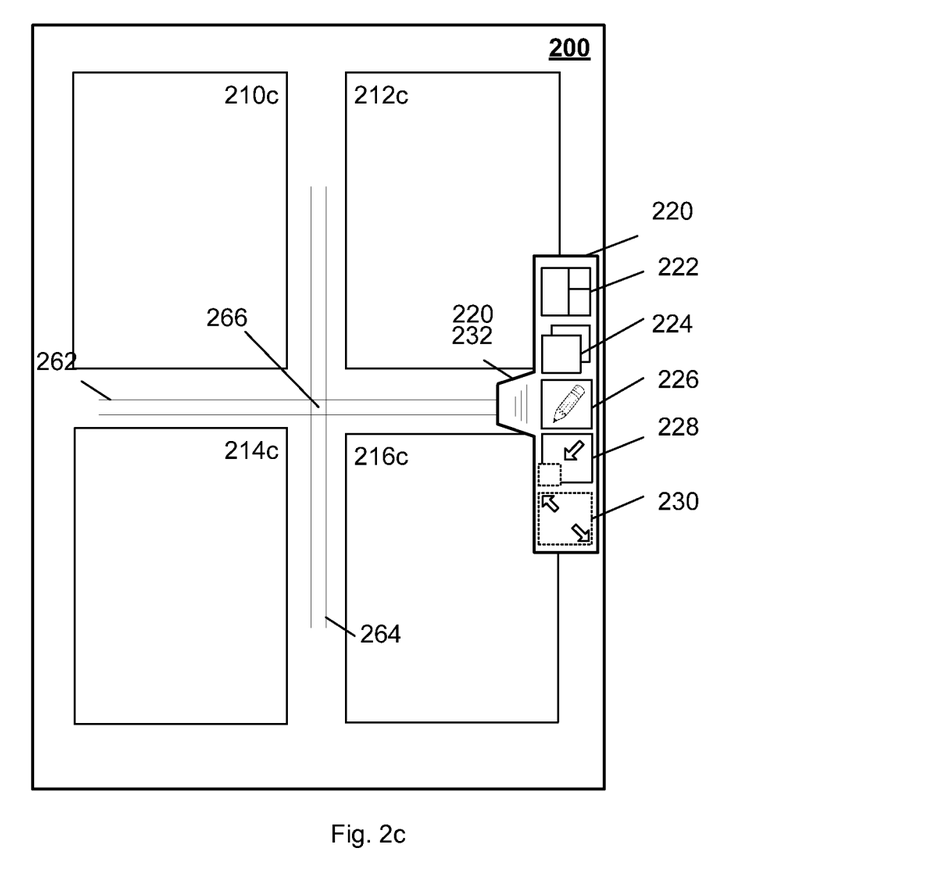
FIG. 2c shows an example of the screen of the mobile terminal displaying multiple windows under a tiled mode.

FIG. 2c shows an example of the screen 200 of the mobile terminal 100 displaying multiple windows under a tiled mode, wherein the windows displayed thereon are placed along rows and columns rather than overlapped with each other. Windows 210c, 212c, 214c, 216c in FIG. 2c respectively correspond to the windows 210a, 212a, 214a, 216a in FIG. 2a, The user of the mobile terminal 100 may switch layout of the windows displayed on the screen 200 between the overlap mode and the tiled mode. To this end, the mobile terminal 100 may or may not require be in the edit mode in order to switch the layout of the windows. If no edit mode is required by the mobile terminal 100, the user may directly press the mode selecting button 222 to switch the layout of the windows. If the edit mode is required by the mobile terminal 100, the user may first turn the mobile terminal 100 to the edit mode, and then press the mode selecting button 222. The mobile terminal 100 may detect the mode selecting action of the user over the touch-sensitive screen and switch from the overlap mode to the tiled mode. Pressing the mode selecting button 222 again may render the mobile terminal 100 to switch the tiled mode back to the overlap mode.

Under the tiled mode, the windows 210c, 212c, 214c, 216c are displayed in a tiled manner, i.e., the windows 210c, 212c, 214c, 216c are displayed along rows and columns on the screen 200. The screen may include horizontal separator 262 and/or vertical separator 264 to define the rows and columns. For example, the screen 200 shown in FIG. 2c includes four windows 210c, 212c, 214c, 216c. Accordingly, the screen 200 is divided into four quadrants by a horizontal separator 262 and a vertical separator 264, which cross at a cross point 266. The horizontal separator 262 divides the screen 200 into two rows, wherein the windows 210c and 212c are in the upper row and the windows 214c and 216c are in the lower row of the screen 200. Similarly, the vertical separator 264 divides the screen 200 into two columns, wherein the windows 210c and 214c are in the left column and the windows 212c and 216c are in the right column of the screen 200.

The user may be able to select a target window from the multiple windows 210c, 212c, 214c, 216c and then conduct edit operations thereon. To this end, the user may press the window selecting button 224 on the menu 220. Each time the window selecting button 224 is pressed the mobile terminal 100 may detect the selection action of the user from the touch-sensitive screen 200 and select another window from the multiple windows 210c, 212c, 214c, 216c. The user may also select the target window by directly press and/or touch the window he/she selects from the multiple windows 210c, 212c, 214c, 216c. Selection of the target window may or may not need the mobile terminal to be in the edit mode.

The user may edit the selected window by pressing the mode edit button. When the user press the mode edit button 226 after the target window is selected, the mobile terminal 100 may highlight the four edges of the target window and displays the close button, the maximization button, and the minimization button (not shown) on the target window. If no target windows are selected, the mobile terminal 100 may highlight the four edges of all the windows displayed on the screen and display the close button, the maximization button, and the minimization button on each highlighted window. Operation of the close button 254, the maximization button 252, and the minimization button 250 are the same as in the overlap mode as set forth above.

Figure 2D:
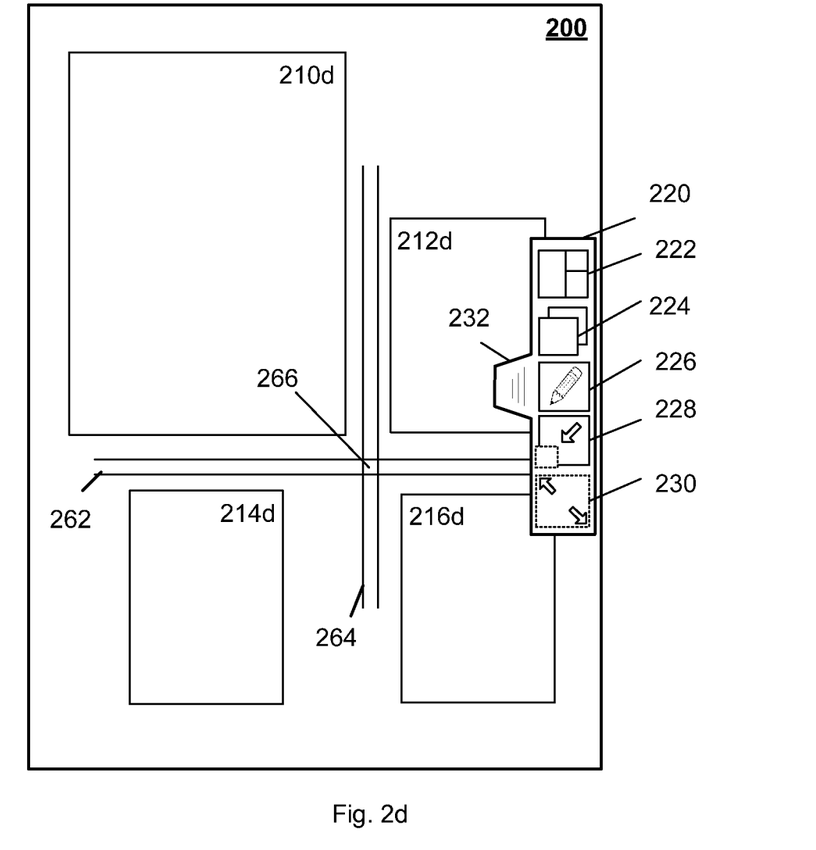
FIG. 2d shows the screen of the mobile terminal under edit mode when the windows layout is in the tiled mode.

Under the edit mode, the user may adjust a window to any size he/she wishes by moving the separators 262, 264. For example, if the user wishes to enlarge window 210c in the first quadrant, the user may place a finger on the horizontal separator 262 on the screen 200 and drag it downward and then place a finger on the vertical separator 264 and drag it to the right. Consequently, the upper left quadrant of the screen 200 is enlarged and the sizes of the remaining three quadrants of the screen 200 are reduced. Accordingly, the window 210c in the first quadrant may be enlarged and the windows 212c, 214c, 216c in the remaining quadrants may be reduced in size. FIG. 2d shows the screen 200 of the mobile terminal 100 when the windows layout is in the tiled mode and one window is enlarged. In FIG. 2d, the windows 210d, 212d, 214d, 216d are corresponding to the windows 210c, 212c, 214c, 216c of FIG. 2c.

Alternatively, the user may simplify the enlargement action by dragging the crossing point 266 towards the lower right corner of the screen 200. Consequently, the horizontal separator 262 may move downward and the vertical separator 264 may move to the right together with the cross point 266.

Under the edit mode, the user may be able to move the windows 210c, 212c, 214c, 216c from one location to the other. To this end, the user may touch a target window 210c with a finger and drag the target window 210c to the new location. Alternatively, the user may place the finger at anywhere on the target window 210c and drag the target window 210c to the new location. Alternatively, the mobile terminal 100 may also require the user to use two or more fingers to touch the target window 210c in order to drag it. Because the windows 210c, 212c, 214c, 216c are displayed under the tiled mode, there may well have another window 212c, 214c, 216c that have already been in the new location. In that case, the mobile terminal 100 may switch the locations of the existing window 212c, 214c, 216c in the new location with the target window 210c. When the mobile terminal 100 detects the moving action from the user over the touch-sensitive screen, it may move the target window 210c accordingly.

To minimize the target window 210c, in addition to the minimization button 228 the user may press the minimization button 250 on the target window. The mobile terminal 100 may detect the user's minimization operation over the touch-sensitive screen and minimize the target window 210c accordingly. Then the mobile terminal 100 may rearrange the remaining widows on the screen 200 under the tiled mode.

To maximize the target window 210c to full screen, in addition to the maximization button 230 the user may press the maximization button 252 on the target window 210c. Alternatively, the user may drag the horizontal separator 262, the vertical separator 264, or the cross point 266. When any of the horizontal and vertical separators 262, 264 is dragged to reach an edge of the screen 200, the mobile terminal 100 may automatically maximize the target window 210c. For example, in FIG. 2d, when the vertical separator 264 is dragged to touch the right edge of the screen 200, the target window 210d will be automatically maximized to become full screen. The mobile terminal 100 may detect the user's maximization operation over the touch-sensitive screen and maximize the target window to full screen accordingly.

To close the target window 210c, the user may press the close button 254 on the target window 210c or simply drag the target window 210c out of the screen. When the mobile terminal 100 detects the closing action from the user over the touch-sensitive screen, it may close the target window 210c accordingly.

Figure 3:
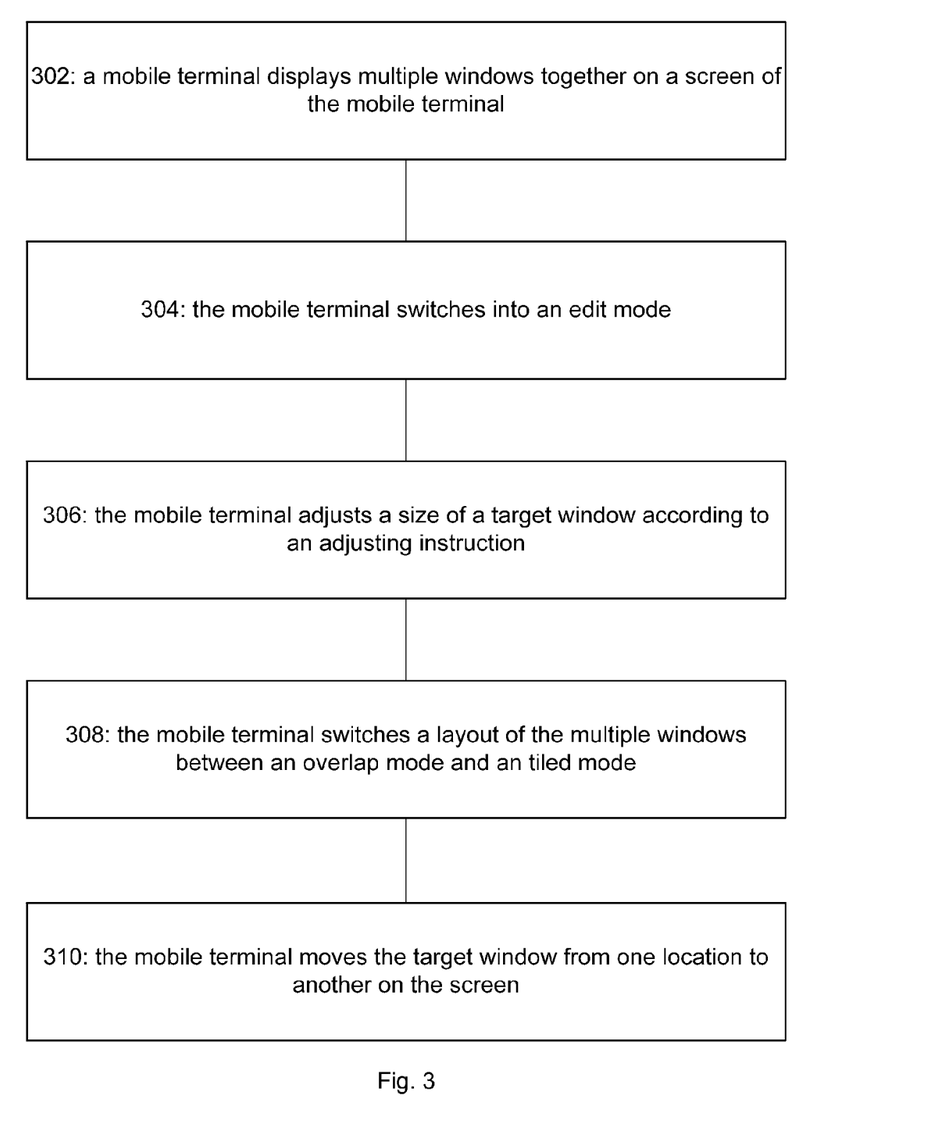
FIG. 3 is a flowchart illustrating a method for operating multiple windows on a mobile terminal.

FIG. 3 is a flowchart illustrating a method for operating multiple windows on a mobile terminal. The method may be implemented by the mobile terminal 100 and correspond to the example embodiments shown in FIGS. 2a, 2b, 2c, 2d.

In step 302, the mobile terminal 100 may display multiple windows together on the screen 200. The multiple windows may be windows of a single application run on the mobile terminal 100 or may belong to more than one application. Further, the multiple windows may be displayed under the overlap mode or tiled mode.

In step 304, the mobile terminal 100 may receive an edit mode switching instruction and switch into an edit mode consequently. The edit mode switching instruction comprises at least one of a predetermined shaking operation over the terminal conducted by a user and sensed by an accelerometer of the mobile terminal 100; a pressing of at least one of predetermined keys on a keyboard of the mobile terminal 100; a pressing of a virtue button displayed on the screen, wherein the screen is a touch-sensitive screen; and a sliding operation by three or more fingers of the user over the screen of the mobile terminal 100.

In step 306, the mobile terminal 100 may receive an adjusting instruction from a user to adjust a size of a target window of the multiple windows. The adjusting instruction may be a pressing of at least one of predetermined keys on a keyboard of the mobile terminal 100; a pressing of a virtue button displayed on the screen, wherein the screen is a touch-sensitive screen; and two simultaneous sliding operations on the touch screen towards two opposite directions; and a dragging operation acted on a separator. The mobile terminal 100 may adjust the target window according to the first instruction to any size that the user wishes.

In step 308, the mobile terminal 100 may receive a mode selecting instruction to switch a layout of the multiple windows between the overlap mode and the tiled mode. The mobile terminal 100 may respond to the mode selecting instruction without being in the edit mode. Alternatively, the mobile terminal 100 may require be in the edit more in order to respond to the mode selecting instruction.

In step 310, the mobile terminal 100 may receive a window moving instruction and accordingly move the target window from one location to another on the screen. The window moving instruction may be a sliding action exerted on the target window by one or more than one finger of the user. The mobile terminal 100 may respond to the window moving instruction under the edit mode.

While example embodiments of the present disclosure relate to mobile terminals that implementing methods for displaying and adjusting sizes of multiple windows on a screen of a mobile terminal, the mobile terminals and methods may also be applied to other Applications. The present disclosure intends to cover the broadest scope of systems and methods for content browsing, generation, and interaction.

Thus, example embodiments illustrated in FIGS. 1-3 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A handheld mobile terminal comprising:
a display screen;
a processor-readable storage medium storing a set of program instructions for providing the handheld mobile terminal functions to operate multiple windows;
a processor in communication with the storage medium and the display screen, wherein when executing the set of program instructions, the processor is configured to:
   display a plurality of windows simultaneously on the display screen; and
   receive a mode-setting operation to set a window size editing mode for editing size of at least one of the plurality of windows, and when in that mode:
      receive a first instruction to adjust a size of a target window of the plurality of windows to one of a maximum size, an intermediate size, and a minimum size; and
      adjust the size of the target window according to the first instruction,
   wherein the handheld mobile terminal does not respond to the first instruction to adjust the size of the target window unless the window size editing mode is set; and
   wherein the mode setting operation comprises at least one of:
      a predetermined shaking operation sensed by an accelerometer of the handheld mobile terminal;
      a pressing of at least one of predetermined keys on a keyboard of the handheld mobile terminal;
      a pressing of a virtue button displayed on the display screen, wherein the display screen further functions as a touch-sensitive screen; and
      a sliding operation over the display screen of the handheld mobile terminal.

2. The handheld mobile terminal according to claim 1, wherein the handheld mobile terminal is at least one of a smart phone and a tablet computer, and wherein the set of program instructions comprise ANDROID™ operating system.

3. The handheld mobile terminal according to claim 1, wherein the intermediate size is adjustable to any size between the maximum size and the minimum size.

4. The handheld mobile terminal according to claim 1, wherein the processor is further configured to receive a second instruction to switch a layout of the plurality of windows between an overlap mode and a tiled mode, wherein:

in the overlap mode, the plurality of windows overlap at least partially on the display screen, and in the tiled mode, the plurality of windows are arranged as rows and columns on the screen.

5. The handheld mobile terminal according to claim 4, wherein the display screen further functions as a touch screen;

wherein under the tiled mode, the rows and columns are defined by separators; and wherein the first instruction comprises at least one of:
a dragging action on an edge of the target window via the touch screen;
two simultaneous sliding operations on the touch screen towards two opposite directions; and
a dragging operation acted on the separator via the touch screen.

6. The handheld mobile terminal according to claim 1, wherein the processor is further configured to
receive a fourth instruction to move the target window; and
move the target window from one location to another location on the display screen according to the fourth instruction.

7. A method for operating multiple windows in a handheld mobile terminal having a display screen, the method comprising:

displaying, by the handheld mobile terminal, a plurality of windows simultaneously on the display screen; and receiving a mode-setting operation to set a window size editing mode for editing size of at least one of the plurality of windows, and under that mode:
receiving, by the handheld mobile terminal, a first instruction to adjust a size of a target window of the plurality of windows to one of a maximum size, an intermediate size, and a minimum size; and
adjusting, by the handheld mobile terminal, the size of the target window according to the first instruction,
wherein the handheld mobile terminal does not respond to the first instruction to adjust the size of the target window unless the window size editing mode is set; and
wherein the mode setting operation comprises at least one of:
a predetermined shaking operation sensed by an accelerometer of the handheld mobile terminal;
a pressing of at least one of predetermined keys on a keyboard of the handheld mobile terminal;
a pressing of a virtue button displayed on the display screen, wherein the display screen further functions as a touch-sensitive screen; and
a sliding operation over the display screen of the handheld mobile terminal.

8. The method according to claim 7, wherein the handheld mobile terminal is at least one of a smart phone and a tablet computer, and the handheld mobile terminal operates ANDROID™, operating system.

9. The method according to claim 7, wherein the intermediate size is continuously adjustable to any size between the maximum size and the minimum size.

10. The method according to claim 7, further comprising:
receiving, by the handheld mobile terminal, a second instruction to switch a layout of the plurality of windows between an overlap mode and a tiled mode, wherein
in the overlap mode the plurality of windows overlap at least partially on the display screen, and
in the tiled mode, the plurality of windows are arranged as rows and columns on the display screen.

11. The method according to claim 10, wherein the display screen further functions as a touch screen;
wherein under the tiled mode, the rows and columns are defined by separators; and
wherein the first instruction comprises at least one of:
a dragging action on an edge of the target window via the touch screen;
two simultaneous sliding operations on the touch screen towards two opposite directions; and
a dragging operation acted on the separator via the touch screen.

12. The method according to claim 7, further comprising:
receiving, by the handheld mobile terminal, a fourth instruction to move the target window; and
moving, by the handheld mobile terminal, the target window from one location to another location on the display screen according to the fourth instruction.

13. A non-transitory processor-readable storage medium, comprising a set of program instructions for operating multiple windows on a handheld mobile terminal, wherein the set of program instructions, when executed by a processor of the handheld mobile terminal, directs the processor to perform functions of:

displaying a plurality of windows simultaneously on a display screen of the handheld mobile terminal; and receiving a mode-setting operation to set a window size editing mode for editing size of at least one of the plurality of windows, and when in that mode
receiving a first instruction of the handheld mobile terminal to adjust a size of a target window of the plurality of windows to one of a maximum size, an intermediate size, and a minimum size; and
adjusting the size of the target window according to the first instruction,
wherein the handheld mobile terminal does not respond to the first instruction to adjust the size of the target window unless the window size editing mode is set; and
wherein the mode setting operation comprises at least one of:
a predetermined shaking operation sensed by an accelerometer of the handheld mobile terminal;
a pressing of at least one of predetermined keys on a keyboard of the handheld mobile terminal;
a pressing of a virtue button displayed on the display screen, wherein the display screen further functions as a touch-sensitive screen; and
a sliding operation over the display screen of the handheld mobile terminal.

14. The storage medium according to claim 13, wherein the intermediate size is adjustable to any size between the maximum size and the minimum size.

15. The storage medium according to claim 13, wherein the set of program instructions further directs the processor to perform functions of:
receiving a second instruction to switch a layout of the plurality of windows between an overlap mode and a tiled mode, wherein
in the overlap mode the plurality of windows overlap at least partially on the display screen, and
in the tiled mode, the plurality of windows are arranged as rows and columns on the display screen.

16. The storage medium according to claim 15, wherein the display screen further functions as a touch screen;

wherein under the tiled mode, the rows and columns are defined by separators, and wherein the first instruction comprises at least one of:
- a dragging action on an edge of the target window via the touch screen;
- two simultaneous sliding operations on the touch screen towards two opposite directions; and
- a dragging operation acted on the separator via the touch screen.

17. The storage medium according to claim 13, wherein the set of program instructions further directs the processor to perform functions of:

receiving a fourth instruction to move the target window; and moving the target window from one location to another location on the display screen according to the fourth instruction.

* * * * *